United States Patent [19]

Gundlach

[11] Patent Number: 4,937,509
[45] Date of Patent: Jun. 26, 1990

[54] ELECTRONIC BRAKING CIRCUIT FOR ROTATING AC ELECTRICAL MOTORS

[75] Inventor: Joseph C. Gundlach, Oak Ridge, Tenn.

[73] Assignee: Acraloc Corporation, Oak Ridge, Tenn.

[21] Appl. No.: 257,630

[22] Filed: Oct. 14, 1988

[51] Int. Cl.⁵ .............................................. H02P 3/20
[52] U.S. Cl. ..................................... 318/362; 318/363
[58] Field of Search ............... 318/362, 364, 366, 368, 318/370, 373, 374, 375, 377, 378, 261, 273, 363, 269, 265, 86

[56] References Cited

U.S. PATENT DOCUMENTS

| | | | |
|---|---|---|---|
| 2,973,467 | 2/1961 | Choudhury et al. | 312/368 |
| 3,054,037 | 9/1962 | Gaddis et al. | 318/368 X |
| 3,439,249 | 4/1969 | Brendemuehl | 318/368 |
| 3,800,202 | 3/1974 | Oswald | 310/368 X |
| 3,872,363 | 3/1975 | Gross | 318/377 X |
| 3,903,464 | 9/1975 | Lyon et al. | 318/377 X |
| 3,965,404 | 6/1976 | Peterson | 318/377 X |
| 4,132,934 | 1/1979 | Morton et al. | 318/377 X |
| 4,133,413 | 1/1979 | Watanabe | 318/368 X |
| 4,792,734 | 12/1988 | Watanabe | 318/375 X |

Primary Examiner—William M. Shoop, Jr.
Assistant Examiner—A. Jonathan Wysocki
Attorney, Agent, or Firm—Pitts and Brittian

[57] ABSTRACT

An electronic braking circuit, for use with normal motor energizing circuits, to achieve rapid and controlled stopping of rotating AC motors after removing the driving power. The braking circuit comprises a transformer having a relatively high voltage-low current AC output, e.g. 120v fused at 15A, which is rectified by a full wave bridge rectifier. A phase-controlled triac is provided for selectively applying the unipolar output of the rectifier to the windings of the motor, causing a unidirectional current flow through the windings which charges the inductance of the windings and generates a braking torque. One or more diodes are provided for discharging the inductance of the motor windings during the non-conducting periods of the triac, thereby continuing the unidirectional current flow through the windings. Phase control circuitry is provided for determining the conducting and non-conducting periods of the triac.

11 Claims, 6 Drawing Sheets

ELECTRONIC BRAKING CIRCUIT FOR ROTATING AC ELECTRICAL MOTORS

DESCRIPTION

1. Technical Field

This invention relates to an electronic brake for selectively stopping the rotation of a single-phase or three-phase AC motor. The electronic brake generally comprises a complete motor starter unit for general application to three-phase and single-phase motors, typically from one to five horsepower.

2. Background Art

In a variety of industries, it is desirable to be able to quickly stop or brake the rotation of equipment powered by AC motors. For example, in the meat cutting industry it is desirable and generally required by O.S.H.A. safety regulations that equipment such as circular saws used in that industry come to a complete stop within about one or two seconds after the operator releases the power-on switch to the device. However, because an instantaneous or near instantaneous stop will damage the gears and cause the unscrewing of mechanical components within such devices as well as kick-back in hand held devices, it is preferable that they be stopped in a controlled manner over a period of time which is less than that required for safety reasons.

It is well known in the art that when a DC current is supplied to the windings of an AC motor which is rotating, a braking torque will be generated which tends to stop the rotation of the motor. Prior art brakes have used low voltage-high current DC power supplies to supply the current required for braking action. The ability to produce high current within the motor windings is required to achieve the desired braking performance. These prior art brakes have two significant disadvantages. First, they require large power supplies which are both heavy and costly when compared to high voltage-low current power supplies. Second, they are much more difficult to control electronically because of the high current outputs.

Therefore, it is an object of the present invention to provide an electronic brake which utilizes a high voltage-low current AC power supply to generate a DC current of sufficient magnitude in the windings of an AC motor to achieve the desired braking result.

It is a further object of the present invention to provide an electronic brake which can be easily and simply controlled such that the braking torque generated in the motor can be varied to meet the needs of different applications.

It is a further object of the present invention to provide an electronic brake wherein the braking power supplied to the motor can be timed such that such braking power is disconnected from the windings of the motor after a predetermined interval of time, normally slightly longer than the time required to bring the motor to a complete stop.

Another advantage of an electronic brake made in accordance with the present invention has been noted during experiments with prototypes of the invention. It appears that the invention works equally well with a varying range of motor sizes without making significant component changes.

DISCLOSURE OF THE INVENTION

Other objects and advantages will be accomplished by the present invention which provides an electronic braking circuit for stopping the rotation of an AC motor after forward driving power is disconnected. The braking circuit of the present invention comprises a transformer whose AC output is converted to a unipolar power supply by a full-wave bridge rectifier. In the preferred embodiment, a phase controlled triac is provided for selectively applying the transformer power to the full wave bridge rectifier and motor which induces a unidirectional current which charges the inductance of the windings and generates a braking torque which opposes the rotation of the motor. In the preferred embodiment, a diode is provided through which the charged inductance of the windings is discharged during the non-conducting periods of the triac, thereby continuing the unidirectional current flow through the windings and the generated braking torque. An electronic phase control circuit is provided for selectively controlling the conducting and non-conducting periods of the triac. A timer circuit is provided for terminating braking power after the motor has come to a complete stop. In the preferred embodiment, the braking circuit of the present invention is incorporated into a complete motor starter unit having motor starter contactor (relay) circuitry for selectively applying normal operating power and braking power provided by the braking circuit to the motor. Electrical and mechanical interlocks are provided which prevent simultaneous connection of normal operating power and braking power to the motor.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

The present invention is for an electronic brake embodied in a complete motor starter unit having integrated braking circuitry for general application to three-phase and single-phase AC motors. Although the drawings and descriptions herein are for a three-phase application, it will be appreciated by those skilled in the art that simple modifications of the described embodiment are all that would be required for a single-phase application. Further, it will be appreciated by those skilled in the art that simple component changes are all that would be required to accommodate various power line voltages from 208v to 580v.

Figure 1:
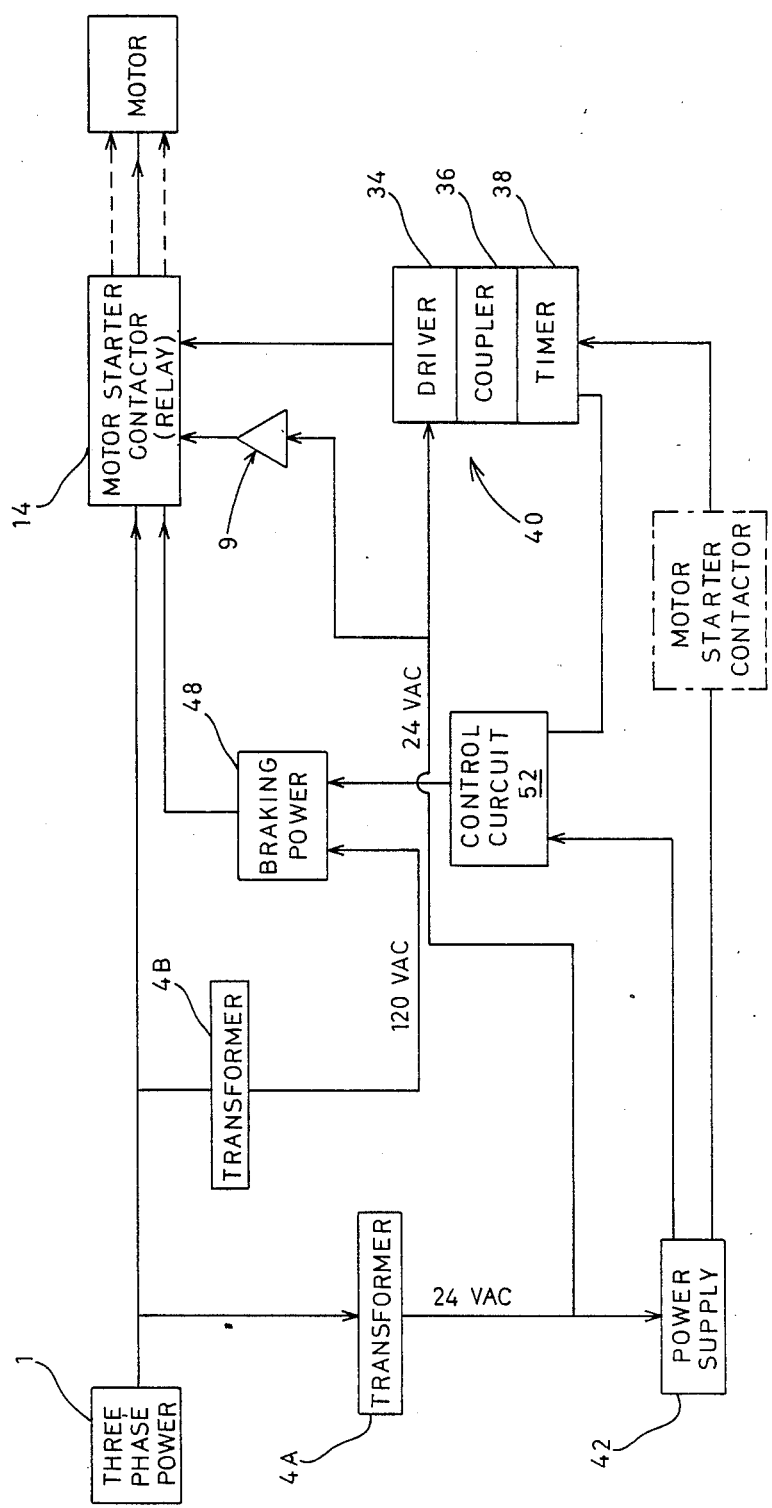
FIG. 1 is a block diagram of circuitry illustrating various features of the present invention.
Figure 2:
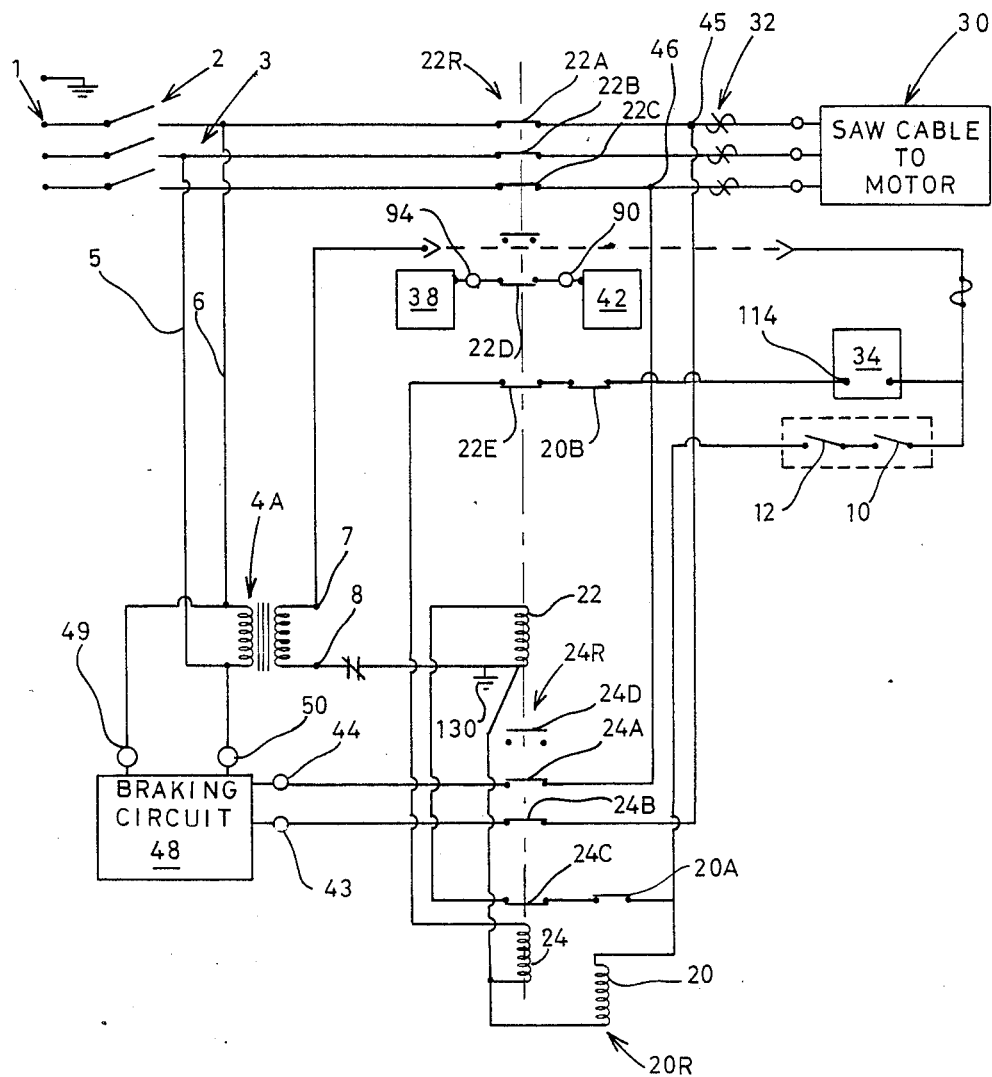
FIG. 2 is a schematic of the motor starter contactor circuit, with other connected circuits shown as blocks, of one embodiment of the present invention.

In one embodiment of the present invention, three-phase AC power is provided to the unit as indicated at 1 in FIG. 1 and generally at 1 in FIG. 2 through a set of disconnects shown generally at 2 in FIG. 2. Line-to-line voltage indicated generally at 3 in FIG. 2 is provided to two transformers of conventional design indicated at 4A and 4B in FIG. 1 through leads 5 and 6 shown in FIG. 2. The transformer 4A converts the line voltage to 24 VAC and the transformer 4B converts the line voltage to 120 VAC. The 24 VAC output of the transformer 4A is indicated at 7 and 8 in the circuit shown in FIG. 2.

In normal operation of a motor driven device, e.g. a circular saw used in the meat cutting industry, the operator will manually close two switches for two handed operation (one switch for each hand), indicated generally at 9 in FIG. 1, which are connected in series as shown at 10 and 12 in FIG. 2. The phantom line around switch 10 and 12 in FIG. 2 indicates that the switches are physically located proximate the handle of the motor-driven device being controlled.

Referring now to FIG. 2, when switches 10 and 12 are closed, 24 VAC power is applied to the coil 20 of a relay, indicated generally at 20R, which closes contact 20A and opens contact 20B. When contact 20A is closed, 24 VAC power energizes the coil 22 of a relay, indicated generally at 22R, which closes contacts 22A, 22B, and 22C, and opens contacts 22D and 22E. When contacts 22A, 22B, and 22C close, power is supplied to the motor cable indicated generally at 30 through overload protection indicated generally at 32. The device will then be running in normal forward operation.

Still referring to FIG. 2, when the operator opens either switch 10 or switch 12, coil 20 will be de-energized and contact 20A will be opened and contact 20B will be closed. When 20A opens, coil 22 will be de-energized, opening contacts 22A, 22B, and 22C thereby disconnecting normal forward operation power to the motor windings, and closing contacts 22D and 22E. When 22D closes, a signal from the the power supply 42 initiates the timer 38 which provides a signal which turns the driver 34 on thereby providing AC power through the now closed contacts 20B and 22E to energize coil 24 of the relay indicated generally at 24R which closes contacts 24A and 24B and opens contact 24C. When 24A and 24B are closed the circuit is completed such that the output 43, 44 of the braking power circuit 48 is connected to the leads of two of the motor windings as indicated at 45 and 46. It will be appreciated by those skilled in the art that the contacts 20A, 20B, 22E, and 24C comprise an electrical interlock which prevents the motor forward coil 22 and the motor braking coil 24 from being energized at the same time. Further, the motor starter circuit of the present invention includes a mechanical interlock between the relays 22R and 24R which prevents the electrical interlock from being manually overridden.

Figure 3:
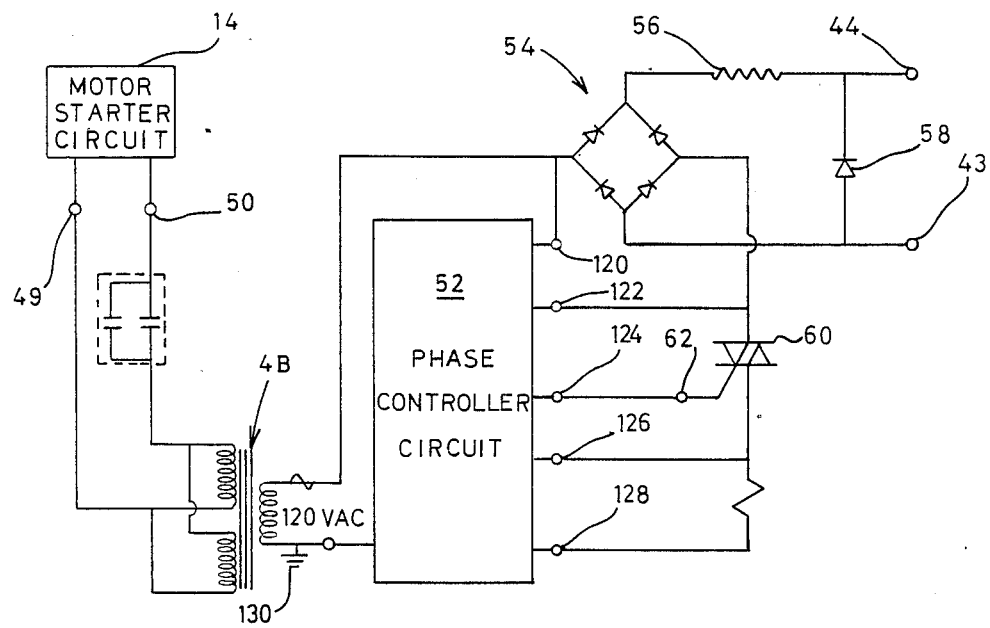
FIG. 3 is a schematic of the braking power circuit, with other connected circuits shown as blocks, of one embodiment of the present invention.

Turning now to FIG. 3, a schematic of the braking power circuit indicated generally at 48 in FIGS. 1 and 2 is shown. This figure indicates circuit connection points. Line voltage is supplied at circuit connection points 49 and 50 as indicated in this figure and FIG. 2. This line voltage is converted to 120 VAC by the transformer indicated at 4B in this figure and FIG. 1. The output of the braking power circuit is connected to the motor starter contactor circuit at circuit connection points 43 and 44 as indicated in this figure and FIG. 2.

Figure 4:
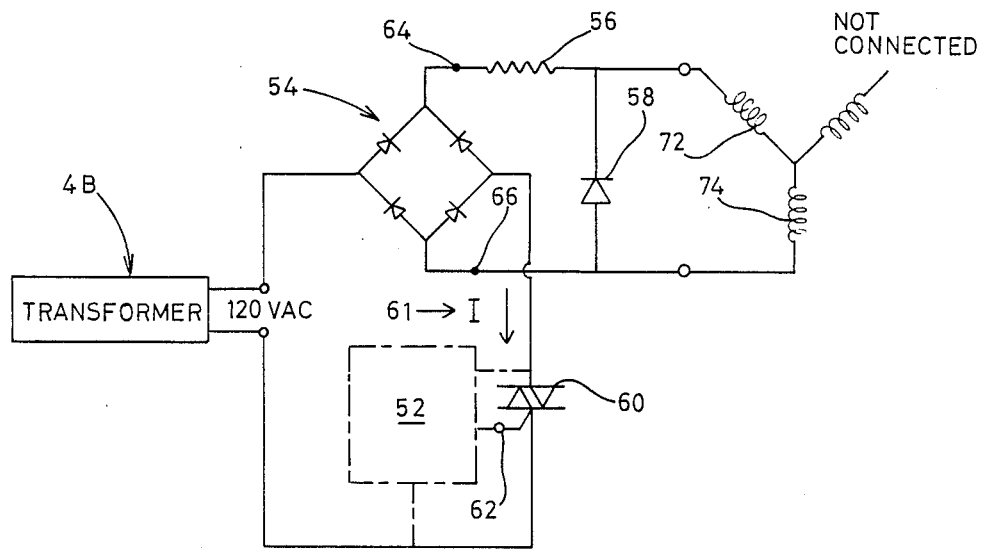
FIG. 4 is a simplified braking power circuit diagram.
Figure 4A:
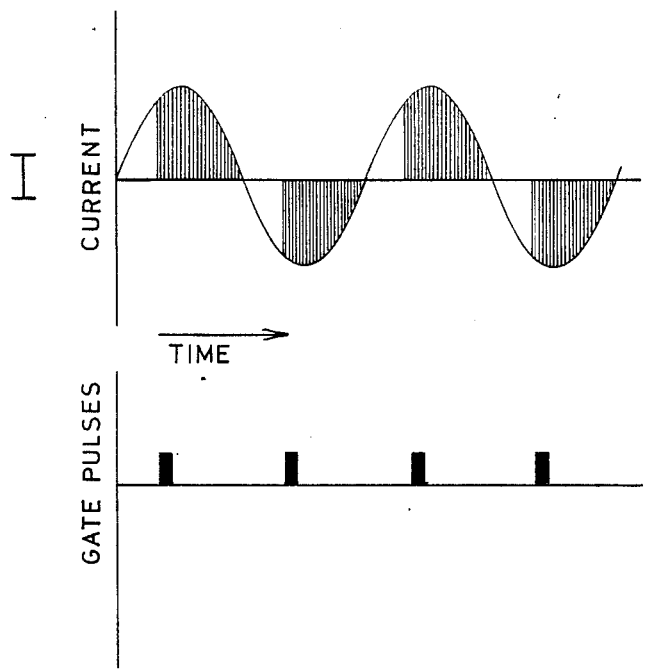
FIG. 4A depicts the current through the triac shown in the braking circuit in FIG. 4 and the trigger pulses applied to its gate when the torque.
Figure 4B:
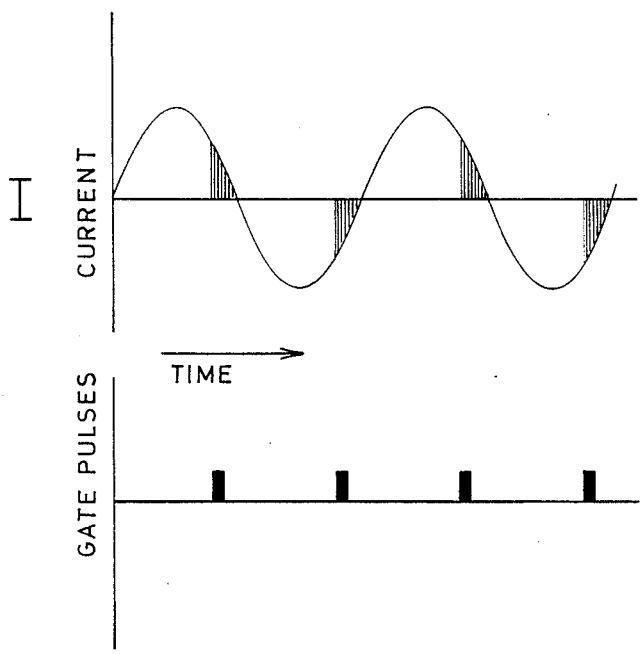
FIG. 4B depicts the current through the triac shown in the braking circuit in FIG. 4 and the trigger pulses applied to its gate when the circuit is adjusted for relatively low braking torque.

Referring to FIG. 4, a simplified circuit diagram is shown for indicating how braking power is supplied to the motor windings. From this figure, it can be seen that 120 VAC is supplied by the transformer 4B. This 120 VAC is converted, during conduction of the triac, to a unipolar voltage source by the full wave bridge rectifier indicated generally at 54. The output at 64 and 66 depends upon the conducting time of the triac (bi-directional thyristor) shown at 60. When the triac 60 is conducting, a unipolar voltage is present at 64 and 66 which induces a unidirectional current in and charges the inductance of the motor windings shown at 72 and 74. When the charging current is high, a larger portion of the voltage at 64, 66 will be dropped across the current-limiting resistor shown at 56. When the triac 60 is not conducting after the first and successive charging cycles, the charged inductance of the motor windings 72 and 74 will continue the current flow through the windings 72 and 74 by discharging through the diode shown at 58. The charging and discharging currents through the motor windings are in the same direction; therefore, power applied to the motor windings 72 and 74 will approach a low voltage - high current DC situation. It will be appreciated by those skilled in the art that when a DC current is passed through the windings of an AC motor, it will result in a braking force being applied to the motor. The periodic conducting time of the triac 60 is determined by the signal from the phase controller circuit 52 which is present at its gate terminal 62. Depending upon the trigger pulses present at 62, the triac 60 will conduct during portions or phases of each cycle of the 120 VAC supplied to the braking circuit. With appropriate trigger pulses at 62, the charging time of the inductance of the motor windings will be short and the current through the motor windings low, thereby reducing the braking force on the motor. As the pulses at 62 are appropriately changed, the charging time and the current through the motor windings will be increased, thereby increasing braking torque. Accordingly, braking torque can be controlled by controlling the pulses to the gate 62 of the triac 60. FIGS. 4A and 4B illustrate the phase-controlled conducting periods of the triac 60. The shaded portions of the upper graph in each figure represents the current I shown generally at 61 in FIG. 4 during the conducting periods of the triac 60. The triac 60 begins conducting when a trigger pulse is applied to its gate 62 and stops conducting when the current through it drops to zero. Therefore, the phase angle of the AC output of the transformer 4B at which trigger pulses are applied to the gate 62 determines the conducting periods of the triac 60 and therefore the braking current through the windings of the motor. The phase angle of the gate trigger pulses is determined by the phase control circuit 52.

Figure 5:
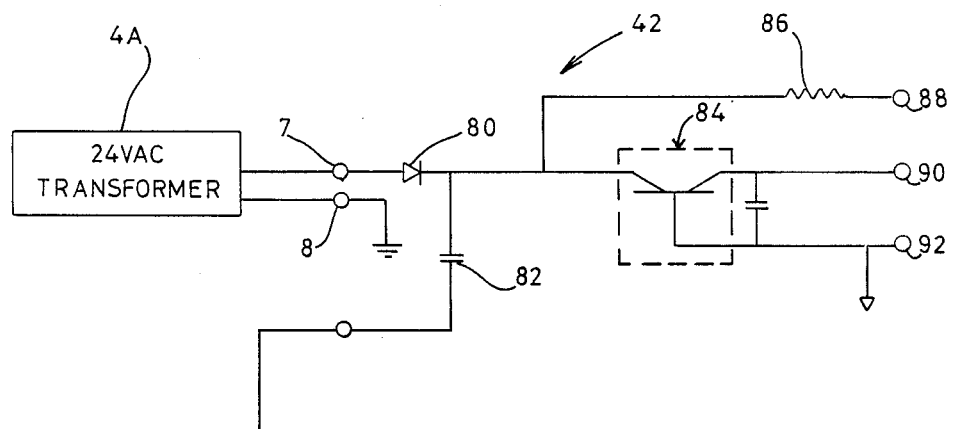
FIG. 5 is a schematic of the power supply circuit with other connected circuits shown as blocks.

Turning now to FIG. 5, a schematic of the power supply indicated generally at 42 in FIGS. 1 and 2 is shown. The power supply 42 converts the 24 VAC output of the transformer 4 to a regulated DC voltage, which is used to initiate the timer 38, and to a pulsed DC voltage source for control circuit 52 which is internally regulated by the control circuit. In this circuit, the diode 80 functions as a half wave rectifier of the 24 VAC input from the transformer 4A. The output of the diode 80 is applied across the capacitor 82. A solid state voltage regulator shown generally at 84 converts the voltage applied across the capacitor 82 to a DC voltage of predetermined fixed amplitude at the output of the power supply circuit indicated at 90 and 92. This output is used to initiate the timer shown at 38 in FIGS. 1 and 2 when the contact 22D shown in FIG. 2 is closed. The output of the power supply circuit at 88 and 92 is connected to the phase control circuit shown at 52 in FIG. 1 as indicated by the same reference numerals in FIG. 7. The resistor shown at 86 is a voltage dropping resistor for matching the output at 88 and 92 to components in the phase control circuit 52.

Figure 6:
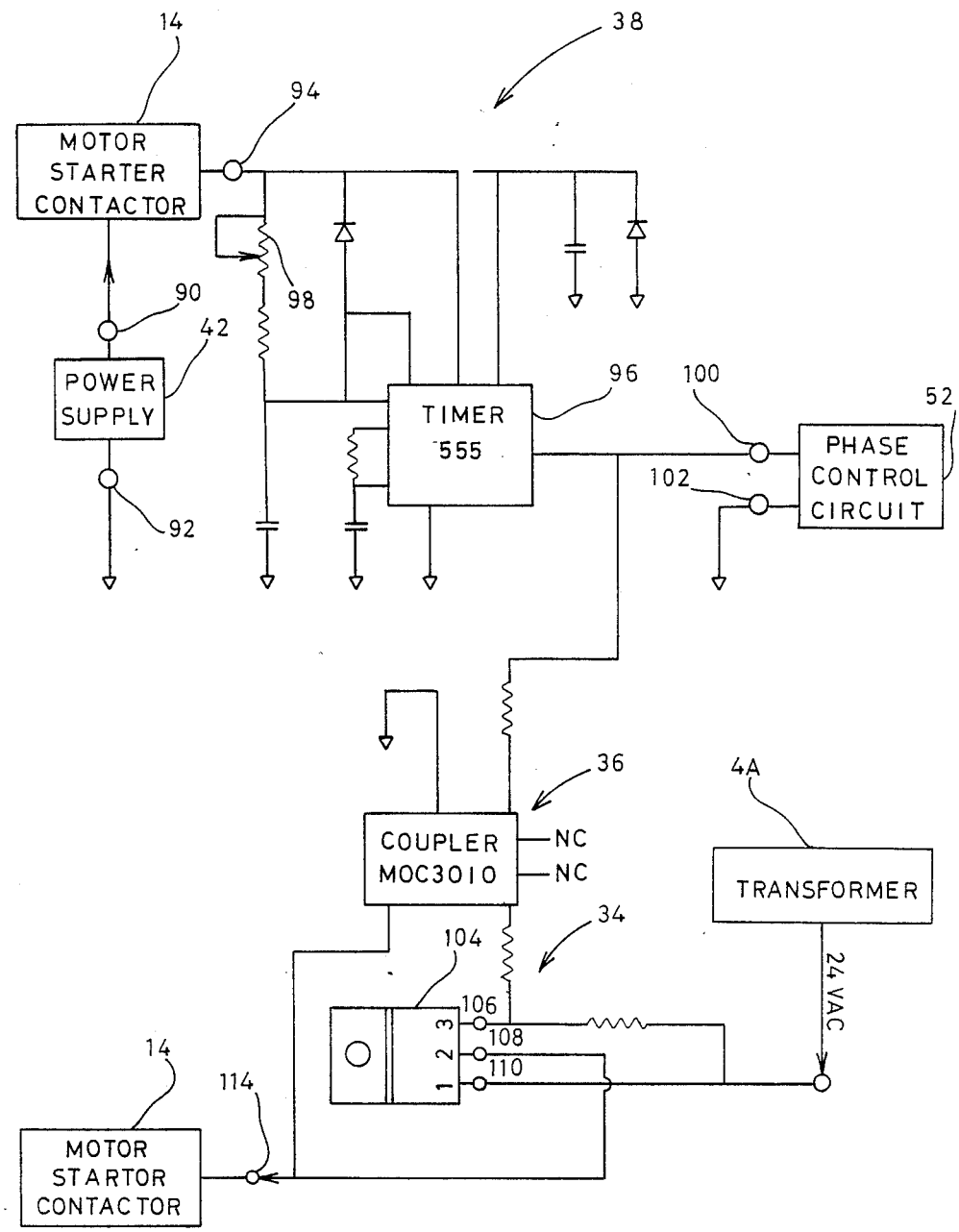
FIG. 6 is a schematic of the timer-coupler-driver circuits with other connected circuits shown as blocks.

Referring now to FIG. 6, a schematic of the timer-coupler-driver circuitry indicated generally at 40 in FIG. 1 is shown. The timer circuit is shown generally at 38. When the contact, shown at 22D in FIG. 2, in the motor starter contactor 14 closes, a fixed amplitude DC voltage at 94 and 92 initiates the timer 96 which is an integrated circuit of conventional design. The output of the timer 96 at 100 and 102 is a square pulse of fixed amplitude which has a duration that can be adjusted by the rheostat shown at 98. The output of the timer is connected to an optical coupler shown generally at 36. The optical coupler provides a trigger to the gate 106 of the triac (thyristor) 104 of the driver circuit shown generally at 34 which causes the triac 104 to conduct between its leads 108 and 110 for the duration of the square pulse output of the timing circuit 38. Therefore, power will be supplied by the transformer 4A to the motor starter contactor circuit 14 at the point indicated at 114 in FIG. 6 and FIG. 2 for the duration of the timer output. As previously indicated, this will be the time during which braking power is applied to the motor. Referring back to the timer circuitry 38, it can be seen that the output of the timer 96 at 100 and 102 is also supplied to the phase control circuit 52. It will be appreciated by those skilled in the art that the coupler 36 uses optics to isolate the driver circuit 34 from the timer circuit 38.

Figure 7:
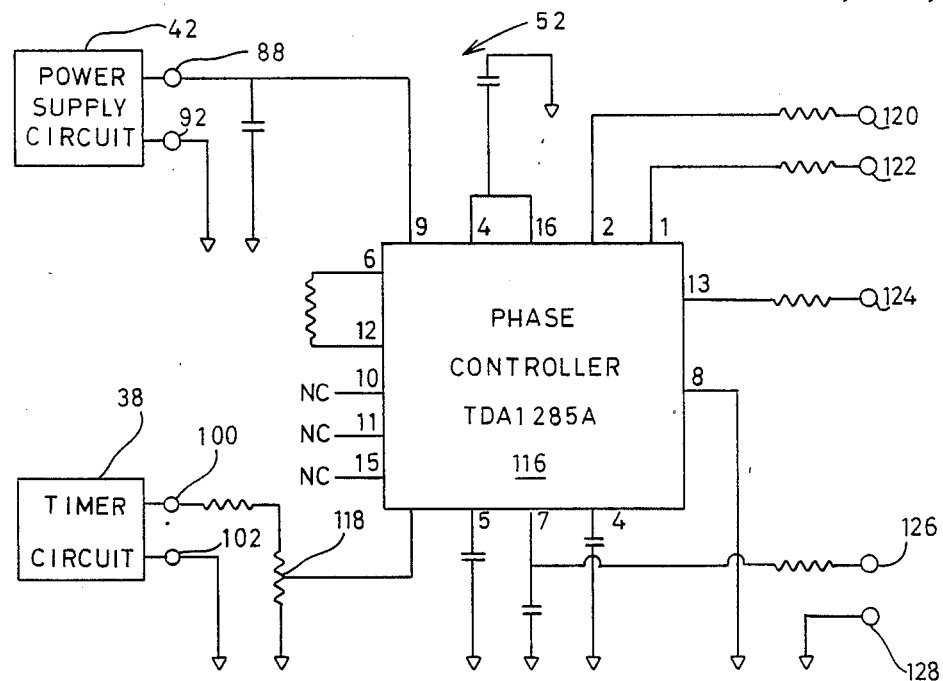
FIG. 7 is a schematic of the phase controller circuit with other connected circuits shown as blocks.

Turning now to FIG. 7, a schematic of the phase control circuit is shown generally at 52 in this and other figures. The phase control circuit contains an integrated circuit phase controller 116 which is powered by the output of the power supply 42 at 88 and 92. The DC power source at 88 and 92 is internally regulated by the phase controller 116. The phase controller 116 receives a pulsed control signal from the timer 38 at 100 and 102 which can be varied by adjusting the trimmer potentiometer 118. The phase controller 116 generates trigger pulses at the output of the control circuit 52 at terminal 124 which is connected to the gate terminal 62 of the triac 60 as shown in FIG. 3. The phase of the output 124 is controlled by the potentiometer 118 such that the conducting and non-conducting phases of the triac 60 shown in FIG. 2 can be varied by adjusting the potentiometer 118 thereby varying the braking torque applied to the motor. Referring to FIGS. 4A and 4B, FIG. 4A depicts the current through the triac 60 shown in FIGS. 3 and 4 for gate pulses which would be present when the voltage at pin 5 of the phase controller 116 is high; FIG. 4B depicts the same conditions when the voltage at pin 5 is low. The voltage at pin 5 can be varied by adjusting the trimmer potentiometer 118. The output connections 120, 122, 124, 126 and 128 of the phase control circuit 52 are connected to the braking power circuit as shown in FIG. 3.

It should be noted that the common connection point represented by the downward pointing arrows in the circuit schematics in FIGS. 5, 6, and 7 is common with the ground 130 of the transformers 4A and 4B as indicated in FIGS. 2 and 3.

Another feature of the invention could be the addition of sensor circuit for detecting stoppage of the motor rotation at which time the brake is released (rather than by a timer circuit shown at 38). This sensor circuit would be connected at pins 10, 11, and 15 in FIG. 7.

It will be appreciated from the foregoing that the braking force applied to the motor by the present invention and therefore the time required to stop the rotation of the motor can be adjusted by the operator by adjusting the trimmer potentiometer shown at 118 in FIG. 7. The timing circuit can be adjusted so that braking power is only applied to the motor for slightly longer than the time required to stop it by adjusting the rheostat 98 shown in FIG. 6.

While a preferred embodiment has been shown and described, it will be understood that it is not intended to limit the invention to such disclosure, but rather it is intended to cover all modifications and alternate constructions falling within the spirit and scope of the invention as defined in the appended claims.

I claim:

1. An electronic braking circuit for rapidly stopping rotation of an AC motor after said motor is disconnected from an energizing source, said motor having at least one winding with an inductance, said braking circuit comprising:
    a source of AC voltage;
    conversion means connected to said AC voltage for producing alternating bi-directional current pulses of selectable time duration when said motor is disconnected from said energizing source;
    control means connected to said conversion means for selecting said time duration of said alternating bi-directional current pulses;
    means for receiving said alternating bi-directional current pulses and for producing unidirectional voltage pulses corresponding to substantially the same time duration as said alternating bi-directional current pulses;
    means for passing said unidirectional voltage pulses to said at least one winding to at least partially, and repeatedly, charge said inductance; and
    unidirectional current flow control means connected across said at least one winding to cause flow of a braking current within said at least one winding resulting from discharge of said inductance during intervals between said unidirectional voltage pulses.

2. The circuit of claim 1 wherein said conversion means is a phase-controlled bi-directional switch means, and said control means is a selectable phase control circuit connected to said phase-controlled bi-directional switch means for selecting said time duration of said alternating bi-directional current pulses and thus said unidirectional voltage pulses.

3. The circuit of claim 2 wherein said bi-directional switch means is a phase-controlled triac having a control gate, and said control means provides trigger pulses to said control gate to control conduction time of said triac and thus said time duration of said alternating bi-directional current pulses.

4. The circuit of claim 1 wherein said unidirectional current flow control means is a diode means.

5. The circuit of claim 1 wherein said conversion means is an AC-to-DC rectifier means.

6. The circuit of claim 1 further comprising timing means connected to said control means for stopping said alternating bi-directional current pulses after a selected time interval substantially corresponding to a time necessary to brake said motor.

7. An electronic braking circuit for rapidly stopping rotation of an AC motor after said motor is disconnected from an energizing source by opening first selected contacts in a contactor means, said motor having at least one winding with an inductance, said braking circuit comprising:
   a source of AC voltage;
   phase-controlled switch means connected to said source of AC voltage for producing alternating bi-directional current pulses of selectable time duration when said motor is disconnected from said energizing source;
   selectable phase control circuit means connected to said phase-controlled switch means for selecting said time duration of said alternating bi-directional current pulses;
   rectifying means connected to said phase-controlled switch means for receiving said alternating bi-directional current pulses and for producing unidirectional voltage pulses corresponding to substantially the same time duration as said alternating bi-directional current pulses;
   means for passing said unidirectional voltage pulses to said at least one winding to at least partially, and repeatedly, charge said inductance; and
   diode means connected across said at least one winding to cause flow of a braking current through said at least one winding resulting from discharge of said inductance during intervals between said unidirectional voltage pulses.

8. The circuit of claim 7 wherein said means for passing said unidirectional voltage pulses to said at least one winding includes further selected contacts within said contactor means which close when said first selected contacts open to disconnect said motor from said energizing source.

9. The circuit of claim 7 wherein said phase-controlled switch means is a phase-controlled triac having a control gate, and wherein said selectable phase control circuit provides trigger pulses to said control gate of said triac to control conduction time of said triac and thus time duration of said alternating bi-directional current pulses and said unidirectional voltage pulses.

10. The circuit of claim 7 further comprising timing means connected to said selectable phase control circuit for stopping said alternating bi-directional current pulses after a selected time interval substantially corresponding to a time necessary to brake said motor.

11. An electronic braking circuit for rapidly stopping rotation of an AC motor after said motor is disconnected from an energizing source by opening first selected contacts in a contactor means, said motor having at least one winding with an inductance, said braking circuit comprising:
   a source of AC voltage;
   a phase-controlled triac connected to said source of AC voltage for producing alternating bi-directional current pulses of selectable time duration when said motor is disconnected from said energizing source, said triac having a control gate;
   a selectable phase control circuit connected to and providing trigger pulses to said control gate of said phase-controlled triac for selecting said time duration of said alternating bi-directional current pulses;
   rectifying means connected to an output of said phase controlled triac for receiving said alternating bi-directional current pulses and for producing unidirectional voltage pulses corresponding to substantially the same time duration as said alternating bi-directional current pulses;
   further contacts within said contactor means for passing said unidirectional voltage pulses to said at least one winding to at least partially, and repeatedly, charge said inductance;
   diode means connected across said at least one winding to cause flow of a braking current through said at least one winding resulting from discharge of said inductance during time intervals between said unidirectional voltage pulses; and
   timing means connected to said selectable phase control circuit for stopping said alternating bi-directional current pulses after a selected time interval substantially corresponding to a time necessary to brake said motor.

* * * * *